United States Patent [19]
Dolfi, Sr.

[11] 3,967,605
[45] July 6, 1976

[54] INTAKE VACUUM CONTROLLED MANIFOLD VACUUM SPOILER

[76] Inventor: James J. Dolfi, Sr., P.O. Box 434, Torrance, Calif. 90508

[22] Filed: May 21, 1974

[21] Appl. No.: 471,962

Related U.S. Application Data

[63] Continuation-in-part of Ser. No. 284,271, Aug. 28, 1972, Pat. No. 3,820,518.

[52] U.S. Cl. .......................... 123/119 B; 123/119 D; 137/480; 137/526
[51] Int. Cl.² ......................................... F02M 33/00
[58] Field of Search...... 123/119 B, 119 D, 119 DB; 251/60, 61, 62, 63; 137/526, 479, 480

[56] References Cited
UNITED STATES PATENTS

| | | | |
|---|---|---|---|
| 2,152,028 | 3/1939 | Church............................ | 123/119 B |
| 3,166,061 | 1/1965 | Weiser............................ | 123/119 B |
| 3,594,020 | 7/1971 | Ehlert............................. | 123/119 B |
| 3,809,035 | 5/1974 | Winton........................... | 123/119 B |
| 3,809,127 | 5/1974 | Gilbert........................... | 251/63 |
| 3,810,484 | 5/1974 | Martini........................... | 251/63 |
| 3,820,518 | 6/1974 | Dolfi, Sr......................... | 123/119 B |

FOREIGN PATENTS OR APPLICATIONS

| | | | |
|---|---|---|---|
| 294,455 | 10/1950 | Germany........................ | 123/119 D |
| 640,793 | 7/1950 | United Kingdom............. | 123/119 B |

*Primary Examiner*—Charles J. Myhre
*Assistant Examiner*—James D. Liles
*Attorney, Agent, or Firm*—Clarence A. O'Brien; Harvey B. Jacobson

[57] ABSTRACT

A valve body having a bore formed therethrough defining an air inlet at one end and including a diametrically enlarged counterbore at the other end. The outer end of the counterbore is closed by means of a removable end wall having a small diameter opening formed therethrough and a piston is slidable in the counterbore and includes a shank portion coaxial therewith longitudinally reciprocal in the bore. A compression spring is disposed between the end wall and the piston and yieldingly biases the latter toward a position seated in the inner end of the counterbore. The valve body includes a lateral outlet bore or passage whose inner end opens into the first-mentioned bore intermediate the opposite ends thereof and the outer end of the lateral bore has one arm of a tubular T-fitting secured therein, the other two arms of the tubular T-fitting being adapted to be interposed in a positive crankcase ventilating hose. Further, a vent passsage communicates the inner end of the counterbore with the lateral bore and the small diameter passage or bore formed through the end wall is adapted to be communicated with a source of manifold vacuum of an internal combustion engine, whereby in response to increases in manifold vacuum the piston will be drawn toward the end wall against the biasing action of the compression spring in order to move the end of the piston shank remote from the piston out of registry with the inner end of the lateral bore and thereby establish communication between the inlet end of the bore in which the piston stem is reciprocal with the inner end of the lateral bore.

7 Claims, 4 Drawing Figures

INTAKE VACUUM CONTROLLED MANIFOLD VACUUM SPOILER

This application comprises a continuation-in-part of U.S. Ser. No. 284,271, filed Aug. 28, 1972 for Automatic Manifold Vacuum Spoiler, now U.S. Pat. No. 3,820,518.

BACKGROUND OF THE INVENTION

Heretofore intake manifold vacuum spoilers have been utilized in order to reduce the speed of air passing through the carburetor of an associated internal combustion engine and the vacuum at the outlet ends of at least some of the fuel passages of the carburetor to thereby increase the air-fuel ratio in order to provide more economical operation. In addition, prior attempts have been made to incorporate a vacuum spoiler within the positive crankcase ventilation systems of more recently designed vehicle internal combustion engines in order that the vacuum spoiler systems may be compatible with attempts to reduce combustion engine emissions.

However, most of these previous attempts have incorporated operational characteristics which either excessively increase the air-fuel ratio or do not provide a sufficient increase in air-fuel ratio when the associated internal combustion engine is operating at cruising speeds. It is important that an internal combustion engine be operated under reduced air-fuel ratios when operating at high speeds or under heavy loads in order to reduce the temperature of combustion within the engine and thus the tendency of the exhaust valves of the engine to burn.

BRIEF DESCRIPTION OF THE INVENTION

The vacuum spoiler of the instant invention has been constructed in a manner to be compatible with positive crankcase ventilation systems and to provide the desired increase in air-fuel ratio at cruising and light-load operating conditions without interfering with the built-in capacity of the associated carburetor to provide a fuel enriched air and fuel mixture when the associated engine is operating at high speeds or under heavy loads.

The vacuum spoiler is designed to be coupled to the PCV valve line of the associated combustion engine and to be actuated in response to variations in engine manifold vacuum. In addition, the vacuum spoiler is constructed in a manner whereby it may be readily disassembled for cleaning purposes whenever desired.

The main object of this invention is to provide an automatic vacuum spoiler assembly for an internal combustion engine which will be capable of admitting air into the intake manifold of an internal combustion engine in response to various operating conditions of the internal combustion engine.

A further object of this invention, in accordance with the immediately preceding object, is to provide a vacuum spoiler assembly capable of being actuated in direct response to an increase of vacuum, beyond a predetermined point, within the manifold of the associated engine.

Still another object of this invention is to provide an automatic vacuum spoiler for the intake manifold of an internal combustion engine which is operative in response to engine speed and throttle setting to admit air into the intake manifold of the internal combustion engine whenever the speed of operation of the engine exceeds a given level determined by throttle setting.

A final object of this invention to be specifically enumerated herein is to provide an automatic vacuum spoiler assembly in accordance with the preceding objects which will conform to conventional forms of manufacture, be of simple construction and easy to install so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
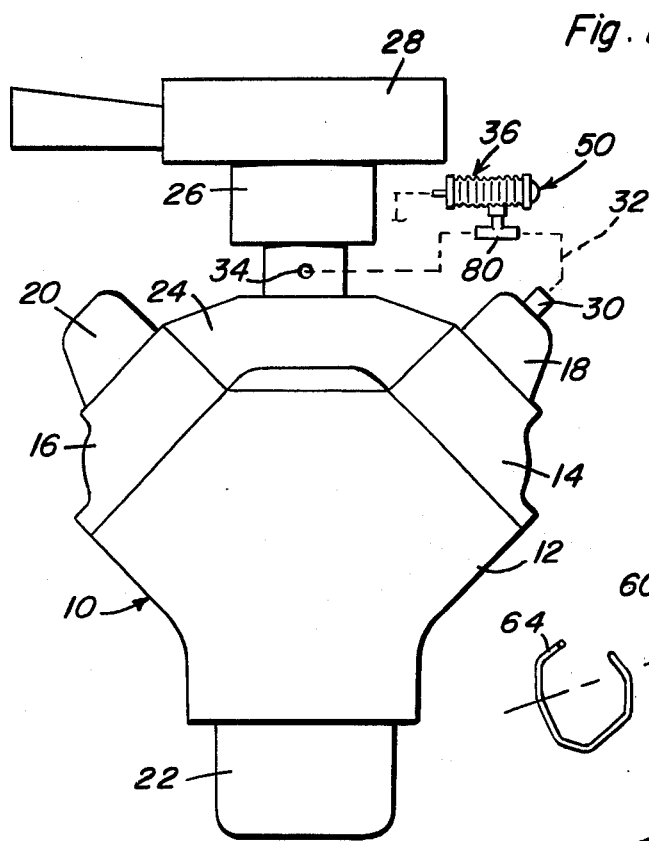
FIG. 1 is an end elevational view of a conventional form of automotive-type internal combustion engine with the vacuum spoiler of the instant invention operatively associated therewith.
Figure 4:
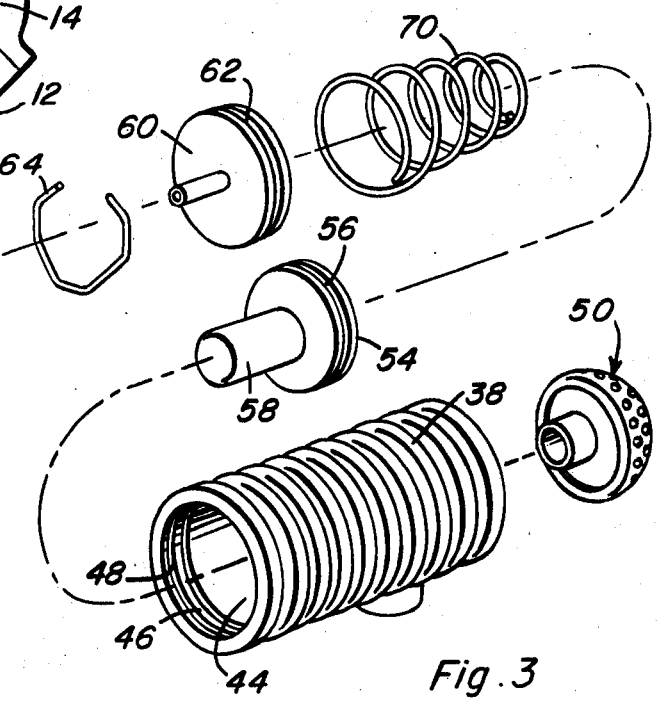
FIG. 4 is an exploded perspective view of the vacuum spoiler.

Referring now more specifically to the drawings, the numeral 10 generally designates a conventional form of combustion engine including an engine block 12, opposite side cylinder heads 14 and 16 topped by removable valve covers 18 and 20, respectively, and including an oil pan 22 removably closing the lower end of the block 12.

An intake manifold 24 is supported between the cylinder heads 14 and 16 and supports a conventional form of carburetor 26 topped by means of an air cleaner 28.

The preceding comprises a description of a conventional form of internal combustion engine.

Conventionally, a positive crankcase valve 30 is seated in an opening provided therefor in the valve cover 18 and has the inlet end of an air tube 32 connected thereto. The outlet end of the air tube 32 extends to an inlet fitting 34 opening into the air passages within the intake manifold 24.

The vacuum spoiler of the instant invention is referred to in general by the reference numeral 36 and includes an elongated and generally cylindrical body 38 having a longitudinal bore 40 formed therethrough. The bore 40 includes a reduced diameter end portion 42 at its inlet end and a diametrically enlarged counterbore 44 at its other end. The outer end of the counterbore 44 includes a second counterbore 46 and the counterbore 46 opens outwardly of the end of the body 38 remote from the reduced diameter bore 42 and includes an internal circumferential groove 48.

An air filter assembly referred to in general by the reference numeral 50 is provided and includes an outlet neck 52 secured in the reduced diameter bore 42. A piston 54 provided with an O-ring 56 is slidable in the counterbore 44 and includes a shank portion 58 snugly and slidably received in the bore 40.

A circular end wall 60 is seated in the second counterbore 46 and includes a circumferential O-ring 62 and a snap ring 64 is removably seated in the groove 48 to releasably retain the end wall 60 in seated position in the inner end of the counterbore 46. The end wall 60 includes an outwardly projecting neck 66 having a center bore 68 formed therethrough and the bore 68 opens through the inner surface of the end wall 60.

Figure 2:
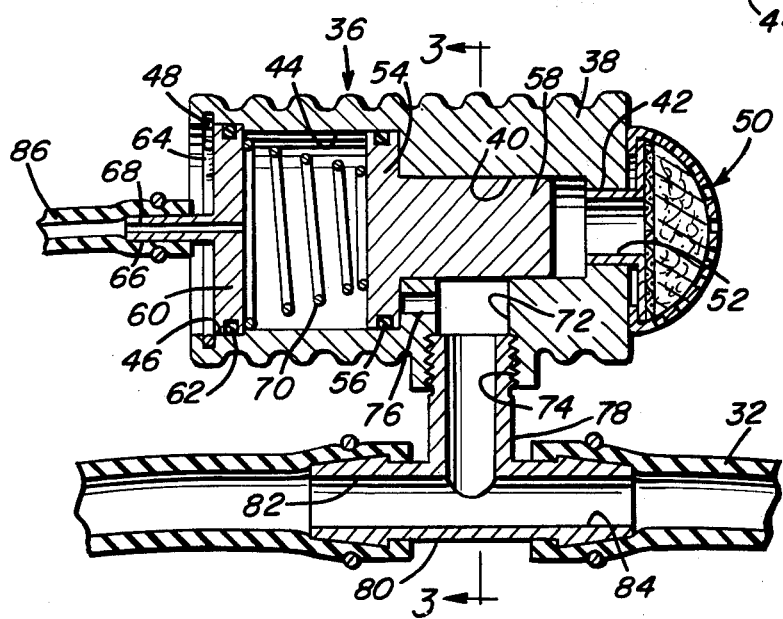
FIG. 2 is an enlarged sectional view taken substantially upon a plane passing through the longitudinal center of the vacuum spoiler.
Figure 3:
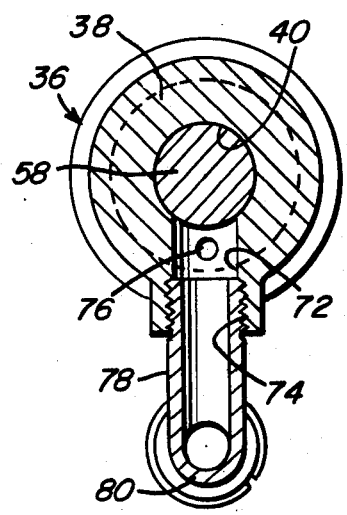
FIG. 3 is a transverse sectional view taken substantially upon the plane indicated by the section line 3—3 of FIG. 2.

A compression spring 70 is interposed between the inner surface of the end wall 60 and the opposing end of the piston 54 and thereby yieldingly biases the piston 54 to the position thereof illustrated in FIG. 2 of the drawings seated in the inner end of the counterbore 44.

The body 38 additionally includes a lateral bore 72 whose outer end opens outwardly of the body 38 and is threaded as at 74 and whose inner end opens into the bore 40 centrally intermediate its opposite ends. Also, the body 38 includes a vent passage 76 communicating the inner end of the counterbore 44 and the inner end of the lateral bore 72.

One tubular arm 78 of a T-fitting 80 is threadedly engaged in the outer end of the lateral bore 72 and the two other tubular arms 82 and 84 of the T-fitting 80 which are in alignment with each other are interposed in the air tube or line 32. Further, one end of a vacuum line 86 is secured over the neck 66 and the other end of the vacuum line 86 is operably connected to any suitable source of manifold vacuum.

From FIG. 2 of the drawings it may be seen that when the piston 54 is fully seated within the counterbore 44 the remote end of the piston stem or shank 58 completely covers and extends beyond the inner end of the lateral bore 72. Thus, in order for communication to exist between the bore 40 and the lateral bore 72 so that ambient air may enter through the air cleaner 50 and into the bore 40 for subsequent passage into the lateral bore 72 the piston 54 must be shifted to the left as viewed in FIG. 2 of the drawings a distance sufficient for the remote end of the piston shank 58 to uncover at least a portion of the lateral bore 72. Of course, the piston 54 is yieldingly biased to its seated position in FIG. 2 by the compression spring 70 and is retracted to the left against the biasing action of the spring 70 in response to vacuum within the counterbore 44 outwardly of the piston 54.

Thus, when engine manifold vacuum increases to a predetermined point the piston 54 begins to shift from the position thereof illustrated in FIG. 2 toward the left and as soon as the piston 58 uncovers the lateral bore 72 ambient air may pass through the air cleaner 50 and into the lateral bore 72 for subsequent movement into the PCV line or tube 32. In this manner, when manifold vacuum reaches a predetermined point ambient air is admitted directly into the intake manifold 24 through the fitting 34 together with crankcase vapors being drawn from the interior of the block 12 and out through the PCV valve 30 supported from the valve cover 18.

When the engine 10 is operating at normal cruising speeds the vacuum within the intake manifold 24 will be sufficient to shift the piston 54 to the left in order to at least partially uncover the lateral bore 72. However, when the throttle of the engine 10 is fully opened and the engine is operating at high speeds or under heavy loads the manifold vacuum within the manifold 24 will be insufficient to cause the piston 54 to shift to the left as viewed in FIG. 2 of the drawings in order that the piston shank 58 will uncover the lateral bore 72. Therefore, the engine 10 is able to operate under its designed fuel enriched air and fuel mixture when operating at high speeds or under heavy loads.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an elongated valve body having a longitudinal bore formed therethrough defining an ambient air inlet at one end and including a diametrically enlarged counterbore at the other end, means closing the outer end of said counterbore and including a small diameter bleed passage formed therethrough, a piston reciprocal in said counterbore and including a shank portion snugly slidable in said bore, said body including a lateral passage whose inner end opens into said bore intermediate its opposite ends and whose outer end opens outwardly of said body, spring means operatively connected between said body and piston yieldingly biasing the latter toward the inner end of said counterbore, said shank being shiftable between a first position with the free end thereof remote from said piston extending completely across and closing the inner end of said lateral passage and a second position with the free end thereof uncovering and thus opening said inner end in response to movement of said piston inward and outward in said counterbore, the outer end of said lateral passage including means for sealed communication with the interior of a PCV valve line of an associated combustion engine, and means adapted to sealingly communicate the outer end of said bleed passage with a source of intake vacuum.

2. The combination of claim 1 wherein said spring means comprises a coiled compression spring disposed in said counterbore between said piston and said means closing the outer end of said counterbore.

3. The combination of claim 1 wherein the outer end of said counter-bore includes a second counterbore, said means closing the outer end of the first-mentioned counterbore comprising an end wall removably seated and secured in the inner end of said second counterbore.

4. In combination, an elongated valve body having a longitudinal bore formed therethrough defining an ambient air inlet at one end and including a diametrically enlarged counterbore at the other end, means closing the outer end of said counterbore and including a small diameter bleed passage formed therethrough, a piston reciprocal in said counterbore and including a shank portion snugly slidable in said bore, said body including a lateral passage whose inner end opens into said bore intermediate its opposite ends and whose outer end opens outwardly of said body, spring means operatively connected between said body and piston yieldingly biasing the latter toward the inner end of said counterbore, said shank being shiftable between positions closing and opening the inner end of said lateral passage in response to movement of said piston inward and outward in said counterbore, the outer end of said lateral passage including means for sealed communication with the interior of a PCV valve line of an associated combustion engine, means adapted to sealingly communicate the outer end of said bleed passage with a source of intake vacuum, said body including a pressure relief passage communicating the inner end of said counterbore and the said lateral passage.

5. The combination of claim 4 including air filter means operatively associated with the end of said bore remote from said counterbore operative to filter ambient air entering said bore from the exterior of said body.

6. The combination of claim 5 wherein said spring means comprises a coiled compression spring disposed in said counterbore between said piston and said means closing the outer end of said counterbore.

7. The combination of claim 6 wherein the outer end of said counterbore includes a second counterbore, said means closing the outer end of the first-mentioned counterbore comprising an end wall removably seated and secured in the inner end of said second counterbore.

* * * * *